United States Patent

Nakamura et al.

[11] Patent Number: 6,030,717
[45] Date of Patent: Feb. 29, 2000

[54] MULTILAYER ANTIREFLECTION COATINGS FOR GRAZING ULTRAVIOLET INCIDENT LIGHT

[75] Inventors: Hiroshi Nakamura; Takeshi Shirai, both of Kawasaki, Japan

[73] Assignee: Nikon Corporation, Tokyo, Japan

[21] Appl. No.: 09/012,125

[22] Filed: Jan. 22, 1998

[30] Foreign Application Priority Data

Jan. 23, 1997 [JP] Japan .................................... 9-010552
Aug. 26, 1997 [JP] Japan .................................... 9-230000

[51] Int. Cl.⁷ ........................................................ B32B 9/00
[52] U.S. Cl. .......................... 428/699; 428/432; 428/913; 359/586; 427/164; 427/166
[58] Field of Search ..................................... 428/699, 432, 428/913; 359/586; 427/164, 166

[56] References Cited

U.S. PATENT DOCUMENTS 4,556,599 12/1985 Sato et al. .
4,966,437 10/1990 Rahn .

FOREIGN PATENT DOCUMENTS 17 97 221 4/1977 Germany .
1-51347 2/1989 Japan .

Primary Examiner—Christopher Raimund
Attorney, Agent, or Firm—Klarquist Sparkman Campbell Leigh & Whinston, LLP

[57] ABSTRACT

Multilayer antireflection coatings are disclosed for grazing incident ultraviolet light having a large angle of incidence. The coatings comprise, from the medium side, layers of high-refractive-index material alternating with layers of low-refractive-index material. Each layer of the high-refractive-index material has the same optical thickness, and each layer of the low-refractive-index material has the same optical thickness. The multilayer antireflection coatings are effective in preventing reflection of p-polarized light, from optical elements coated with such a coating, having a wavelength of 150 nm$\leq \lambda \leq$250 nm in a range of angle of incidence of 70°$\leq \theta \leq$80°.

16 Claims, 3 Drawing Sheets

MULTILAYER ANTIREFLECTION COATINGS FOR GRAZING ULTRAVIOLET INCIDENT LIGHT

FIELD OF THE INVENTION

The present invention relates to multilayer antireflection coatings for optical elements and the like, the antireflection coatings serving to inhibit reflection from the optical elements of grazing incident light, especially ultraviolet light from excimer lasers and the like.

BACKGROUND OF THE INVENTION

The recent development of lasers such as excimer lasers has increased the demand for optical systems and components that can transmit ultraviolet light. Such optical systems and components typically require antireflection coatings effective against grazing incident light, including "grazing" incident light (i.e., incident light having a high angle of incidence θ of generally 70° or greater).

An excimer laser produces linearly polarized light. Depending upon the placement of the optical system relative to the excimer laser, light from the laser enters the optical system as either p-polarized light or s-polarized light.

Conventional multilayer antireflection coatings for grazing incident light consist of stacked layers in which layers of high-refractive-index material and low-refractive-index material are alternatingly arranged. A larger number of layers is required as the angle of incidence is increased (e.g., whenever θ≦70°, the number of layers is four or more).

Conventional multilayer antireflection coatings also typically have a non-periodic multilayer structure in which the optical thickness of each layer is different. Hence, the optical thickness of each layer must be precisely controlled when forming such an antireflection coating. Also, for each incidence angle, the optical thickness of each layer and the number of layers in the antireflection coating must be different.

In making a conventional multilayer antireflection coating for grazing incident light (the coating being made with a non-periodic structure), the following difficulties are encountered: (1) During formation of each of the stacked layers, variations in layer thickness frequently arise; such variations cause corresponding unplanned variations in refractive index over the antireflective coating. Hence, it is necessary to evaluate the refractive index of each layer before deposition. (2) If the optical performance of a coating is different from ideal performance, it is difficult to identify the specific culprit layer(s) in the coating because the optical thickness of each layer is different. Consequently, obtaining a coating that is entirely within specification requires a trial-and-error approach. (3) Parameters that must be controlled to controllably form the correct optical thickness of each layer of the multilayer antireflection coating are complicated. (4) For each angle of incidence, both the optical thickness of each layer and the total number of layers in the multilayer antireflection coating must be different.

SUMMARY OF THE INVENTION

In view of the foregoing shortcomings of conventional multilayer antireflection coatings for grazing incident light, an object of the present invention is to provide effective multilayer antireflection coatings for grazing incident light for ultraviolet light having a larger range of angle of incidence.

According to a first aspect of the invention, a multilayer antireflection coating is provided that comprises multiple stacked layers of high-refractive-index material and low-refractive-index material arranged alternatingly in a sequentially stacked manner. Each alternating layer of the high-refractive-index material has the same optical thickness, and each alternating layer of the low-refractive-index layer has the same optical thickness. The multilayer antireflection coating inhibits reflection therefrom of incident p-polarized light having a wavelength λ (150 nm≦λ≦250 nm) incident on the multilayer antireflection coating at an angle of incidence θ such that 70°≦θ≦80°.

Each of the high-refractive-index layers and each of the low-refractive-index layers has a respective optical thickness. The antireflection coating has an optical period length nd, representing a sum of the optical thickness of the high-refractive-index layer and the optical thickness of the low-refractive-index layer, that is within the range of $0.6\lambda_0 \leq nd \leq 0.65\lambda_0$, wherein $\lambda_0$ is the wavelength of light incident to the antireflection coating. The optical thickness of the high-refractive-index layer and the optical period exhibit a ratio Γ that is preferably within a range of 0.38≦Γ≦0.73.

The high-refractive-index material preferably comprises a substance selected from the group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of such compounds. The low-refractive-index material preferably comprises a substance selected from the group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of such compounds.

The total number N of layers comprising the antireflection coating is preferably within a range of 5≦N≦17.

The foregoing and additional features and advantages of the invention will be more readily apparent from the following detailed description, which proceeds with reference to the accompanying drawings.

DETAILED DESCRIPTION

The following description is directed to representative embodiments of a multilayer antireflection coating for grazing incident light, representing the current best mode of the invention.

Figure 1A:
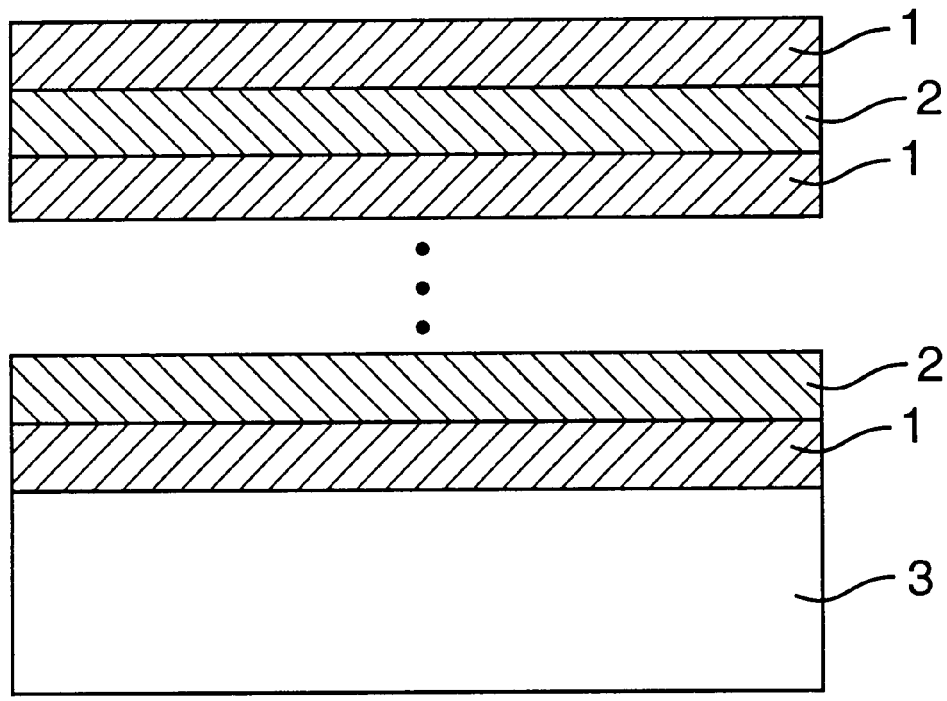
FIG. 1(a) is a sectional schematic diagram of a multilayer antireflection coating for grazing incident light in accordance with the present invention when the number of stacked layers is odd.
Figure 1B:
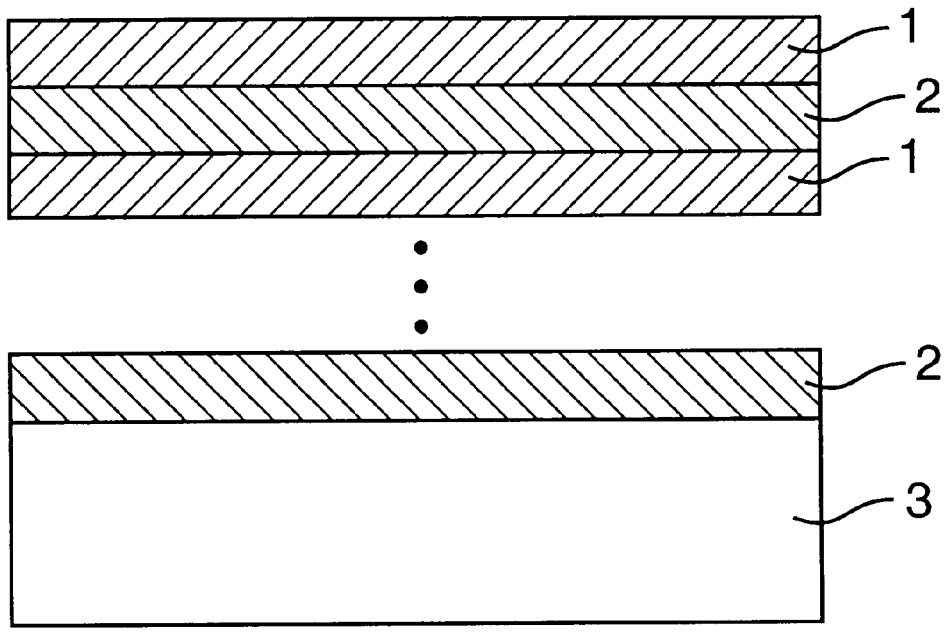
FIG. 1(b) is a sectional schematic diagram of a multilayer antireflection coating for grazing incident light in accordance with the present invention when the number of stacked layers is even.

A schematic elevational sectional diagram of a multilayer antireflection coating for grazing incident light, according to the invention, is shown in FIG. 1. The antireflection coating comprises, from a medium side, a high-refractive-index layer 1, a low-refractive-index layer 2, a high-refractive-index layer 1, and additional such layers in an alternating superposed manner on a substrate 3. The refractive index of a "high-refractive-index" material is higher than the refractive index of the substrate material. The refractive index of a "low-refractive-index" material is lower than the refractive index of the substrate material. Whenever the number of stacked layers is odd, a high-refractive-index layer 1 preferably contacts the substrate (FIG. 1(a)). Whenever the number of lamination layers is even, a low-refractive-index layer 2 preferably contacts the substrate (FIG. 1(b)).

Each high-refractive-index layer 1 preferably has the same optical thickness; similarly, each layer of the low-refractive-index layer 2 preferably has the same optical thickness. If each high-refractive-index layer is made of the same high-refractive-index material, and each low-refractive-index layer is made of the same low-refractive-index material, then the optical thickness of each pair of adjacent layers (consisting of a high-refractive-index layer 1 and a low-refractive-index layer 2) is fixed at a value (representing the "optical period length") that is the same for all such pairs. Thus, a multilayer antireflection coating for grazing incident light in accordance with the present invention has a periodic structure.

The substrate 3 is typically a material that transmits ultraviolet light, such as (but not limited to) silica glass, calcium fluoride, and magnesium fluoride.

The high-refractive-index layers are preferably made of a material selected from a group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of these materials. The low-refractive-index layers are preferably made of a material selected from a group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of these materials.

The sum of the optical thickness of a high-refractive-index layer 1 and an adjacent low-refractive-index layer 2 is termed the "optical period length" nd. The optical period length $nd = n_H d_H + n_L d_L$, wherein $n_H$ is the refractive index and $d_H$ is the physical thickness of the high-refractive-index material, $n_H d_H$ is the optical thickness of the high-refractive-index material, $n_L$ is the refractive index and $d_L$ is the physical thickness of the low-refractive-index material, and $n_L d_L$ is the optical thickness of the low-refractive-index material. The optical period length preferably satisfies the following relationship:

$$0.6\lambda_0 \leq nd \leq 0.65\lambda_0$$

The ratio of the optical thickness of the high-refractive-index layer to the optical period length (also termed the "optical thickness ratio" $\Gamma = n_H d_H / nd$) preferably satisfies the following relationship:

$$0.38 \leq \Gamma \leq 0.73$$

The total number of layers N of the antireflective coating preferably satisfies the following relationship:

$$5 \text{ layers} \leq N \leq 17 \text{ layers}$$

The multilayer antireflection coating can be made by any suitable method such as (but not limited to) vacuum vapor deposition, sputtering, ion plating, chemical vapor deposition (CVD).

To begin formation of the multilayer antireflection coating, a pair of stacked layers consisting of a high-refractive-index layer and a low-refractive-index layer is deposited on the substrate; deposition parameters under which the pair of layers is formed are such that the optical thickness of each layer satisfies the parameters noted above. Additional layers are added in an alternating manner according to fixed deposition parameters for the high-refractive-index layers and the low-refractive-index layers. The resulting multilayer antireflection coating comprises a different number of layers depending upon the anticipated angle of incidence.

A multilayer antireflection coating that satisfies the foregoing parameters exhibits a satisfactory antireflection effect when p-polarized light in the wavelength range of 150 to 250 nm enters the coating at an angle of incidence of 70 to 80°.

EXAMPLE EMBODIMENT 1

In this example embodiment, alternating layers of lanthanum fluoride ($LaF_3$) as the high-refractive-index layer and magnesium fluoride ($MgF_2$) as the low-refractive-index layer were formed on a substrate of synthetic silica glass. The optical thickness of each resulting layer was $n_H d_H = 0.322\lambda_0$ for each of the $LaF_3$ layers, and $n_L d_L = 0.322\lambda_0$ for each of the $MgF_2$ layers. The optical period length nd (i.e., the sum of the optical thickness of the high-refractive-index layer and the optical thickness of the low-refractive-index layer) was $0.644\lambda_0$ (wherein $\lambda_0 = 193.4$ nm), and the ratio of the optical thickness of the high-refractive-index layer to the optical period length was $\Gamma = 0.5$. Each layer was deposited by vacuum vapor deposition.

Eleven separate antireflective coatings were prepared, with the number N of stacked layers ranging from 7 to 17 (i.e., N=7, 8, 9, 10, 11, 12, 13, 14, 15, 16, 17). With respect to each antireflective coating, the materials from which the layers were formed, the optical period length, and the ratio of the optical thickness of the high-refractive-index layer to the optical period length were the same. Formation of each antireflective coating was started by depositing a first pair of stacked layers on the substrate wherein one layer was lanthanum fluoride ($LaF_3$) and the other layer was magnesium fluoride ($MgF_2$). Alternating layers of these materials were applied to this initial two-layer structure until the desired number of layers was reached. The coating-deposition parameters were set such that the respective optical thicknesses were as described above.

Figure 2:
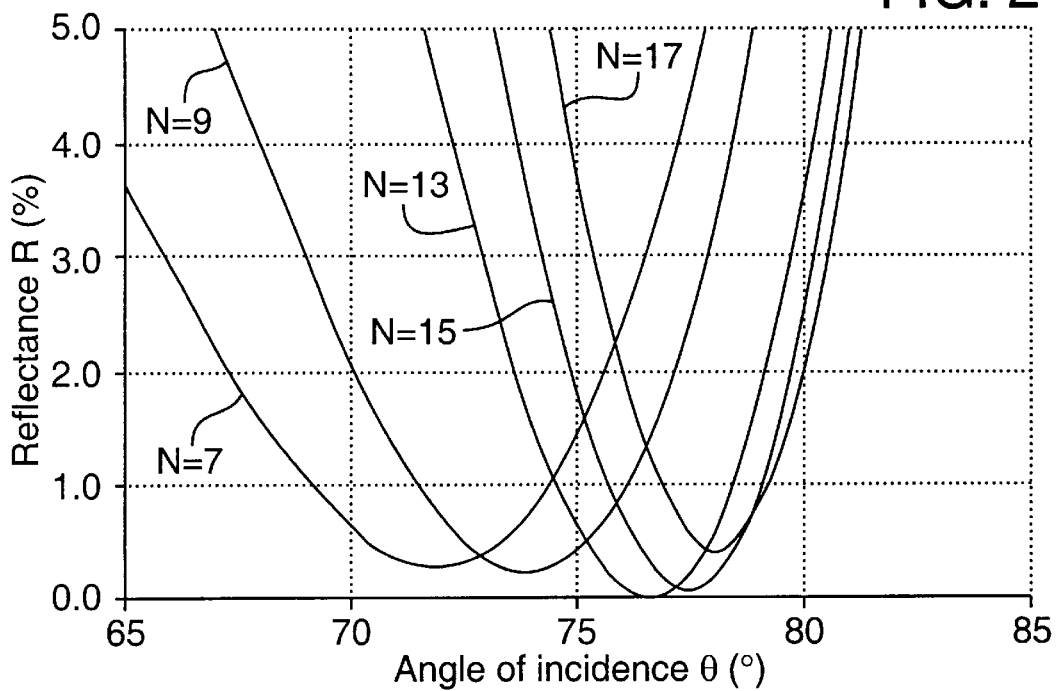
FIG. 2 is a plot of antireflection performance versus angle of incidence of p-polarized light at λ=193.4 nm for multilayer antireflection coatings according to Example Embodiment 1 having 7, 9, 13, 15, and 17 layers.

The angular characteristics of the multilayer antireflection coatings made according to this example embodiment were measured using p-polarized incident light at $\lambda = 193.4$ nm. Table 1 shows, for each value of N from 7 to 17, the angle of incidence at which reflectance was minimized and the value of the reflectance under such conditions. FIG. 2 shows incidence-angle characteristics for certain of the multilayer antireflection coatings according to this example embodiment (i.e., for coatings in which N=7, 9, 13, 15, and 17). The data shown in Table 1 and FIG. 2 indicate that the multilayer antireflection coatings according to this example embodiment have a full antireflection effect with transmittance of 99% or greater when the angle of incidence is in the range $70° \leq \theta \leq 80°$. (For the synthetic silica glass substrate alone, reflectance R=4% at $\theta=70°$ and R=23.3% at $\theta=80°$). These data also indicate that the angle of incidence at which reflectance is minimized is changed simply by changing the number of stacked layers.

TABLE 1

| Number of Layers (N) | Angle of Incidence θ at which Reflectance is Minimized (°) | Minimum Reflectance R (%) |
|---|---|---|
| 7 | 72.1 | 0.3 |
| 8 | 73.0 | 0.3 |
| 9 | 74.4 | 0.2 |
| 10 | 74.7 | 0.2 |
| 11 | 75.5 | 0.1 |
| 12 | 76.0 | 0.1 |
| 13 | 76.7 | 0.1 |
| 14 | 77.0 | 0.1 |
| 15 | 77.6 | 0.1 |
| 16 | 77.8 | 0.2 |
| 17 | 78.2 | 0.4 |

EXAMPLE EMBODIMENT 2

In this example embodiment, alternating layers of lanthanum fluoride ($LaF_3$) as the high-refractive-index layer and cryolite ($Na_3AlF_6$) as the low-refractive-index layer were formed on a substrate of calcium fluoride. The optical thickness of each resulting layer was $n_H d_H = 0.3\lambda_0$ for each of the $LaF_3$ layers, and $n_L d_L = 0.35\lambda_0$ for each of the $Na_3AlF_6$ layers. The optical period length nd (i.e., the sum of the optical thicknesses of the high-refractive-index layer and the low-refractive-index layer) was $0.65\lambda_0$ (wherein $\lambda_0=193.4$ nm), and the ratio of the optical thickness of the high-refractive-index layer to the optical period length was $\Gamma=0.46$. Each layer was deposited by vacuum vapor deposition.

Seven separate antireflective coatings were prepared, with a number N of stacked layers ranging from 5 to 11 (i.e., N=5, 6, 7, 8, 9, 10, 11). With respect to each antireflective coating, the materials from which the respective layers were formed, the optical period length, and the ratio of the optical thickness of the high-reflective-index layer to the optical period length were the same. Formation of each antireflective coating was started by forming a pair of stacked layers on the substrate, wherein one layer was lanthanum fluoride ($LaF_3$) and the other layer was cryolite ($Na_3AlF_6$). The coating-deposition parameters were such that the respective optical thicknesses were as described above.

Figure 3:
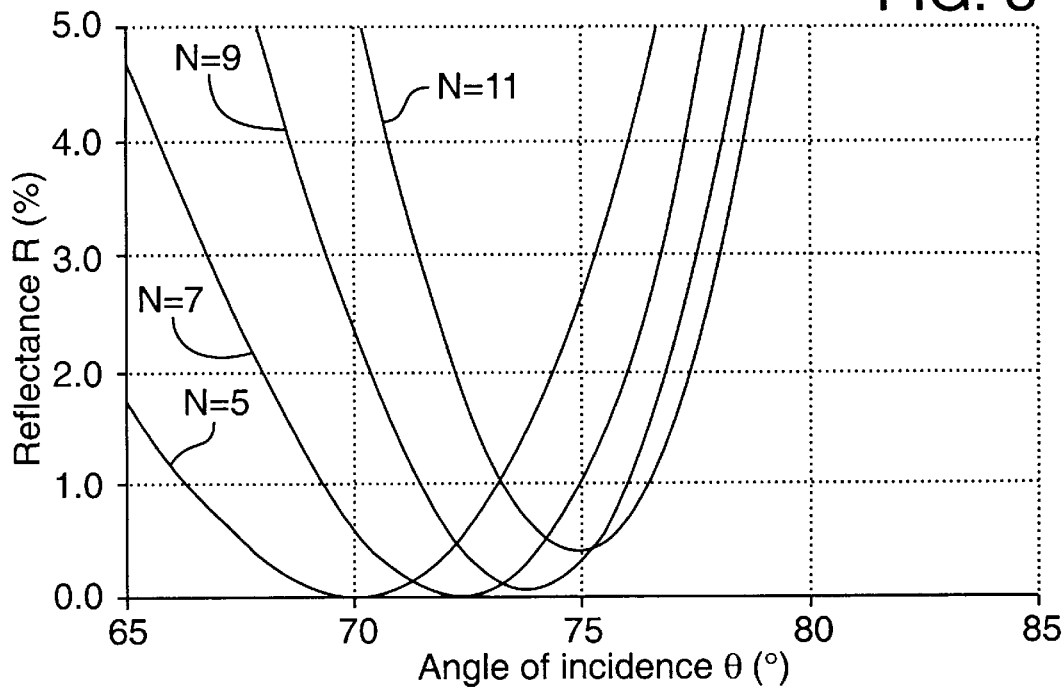
FIG. 3 is a plot of antireflection performance versus angle of incidence of p-polarized light at λ=193.4 nm for multilayer antireflection coatings according to Example Embodiment 2 having 5, 7, 9, and 11 layers.

The angular characteristics of the multilayer antireflection coatings made according to this example embodiment were measured using p-polarized incident light at $\lambda=193.4$ nm. Table 2 shows, for each value of N from 5 to 11, the angle of incidence at which reflectance was minimized and the value of the reflectance under such conditions. FIG. 3 shows incidence-angle characteristics for certain of the multilayer antireflection coatings according to this example embodiment (i.e., for N=5, 7, 9, and 11). The data shown in Table 2 and FIG. 3 indicate that the multilayer antireflection coatings according to this example embodiment have a full antireflection effect with transmittance of 99% or greater when the angle of incidence is in the range $70° \leq \theta \leq 75°$. (For the calcium fluoride substrate alone, reflectance R=4.3% at $\theta=70°$ and R=10.7% at $\theta=75°$). These data indicate that the angle of incidence at which reflectance is minimized is changed simply by changing the number of stacked layers.

TABLE 2

| Number of Layers (N) | Angle of Incidence θ at which Reflectance is Minimized (°) | Minimum Reflectance R (%) |
|---|---|---|
| 5 | 70.0 | 0.1 |
| 6 | 70.7 | 0.1 |
| 7 | 72.4 | 0.1 |
| 8 | 72.8 | 0.1 |
| 9 | 74.0 | 0.1 |
| 10 | 74.2 | 0.1 |
| 11 | 75.0 | 0.4 |

EXAMPLE EMBODIMENT 3

In this example embodiment, alternating layers of lanthanum fluoride ($LaF_3$) as the high-refractive-index layer and cryolite ($Na_3AlF_6$) as the low-refractive-index layer were deposited on a substrate of calcium fluoride. The optical thickness of each resulting layer was $n_H d_H = 0.35\lambda_0$ for each of the $LaF_3$ layers, and $n_L d_L = 0.31\lambda_0$ for each of the $Na_3AlF_6$ layers. The optical period length nd (i.e., the sum of the optical thickness of the high-refractive-index layer and the optical thickness of the low-refractive-index layer) was $0.66\lambda_0$ (wherein $\lambda_0=248$ nm), and the ratio of the optical thickness of the high-refractive-index layer to the optical period length was $\Gamma=0.53$. Each layer was deposited using vacuum vapor deposition.

Five separate antireflection coatings were prepared, with a number N of layers ranging from 9 to 17 (i.e., N=9, 11, 13, 15, 17). With respect to each antireflection coating, the materials from which the layers were formed, the optical period length, and the ratio of the optical thickness of the high-refractive-index layer to the optical period length were the same. Formation of each antireflection coating was started by forming a pair of layers on the substrate, wherein one layer was lanthanum fluoride ($LaF_3$) and the other layer was cryolite ($Na_3AlF_6$). The coating-deposition parameters were such that the respective optical thicknesses were as described above.

Figure 4:
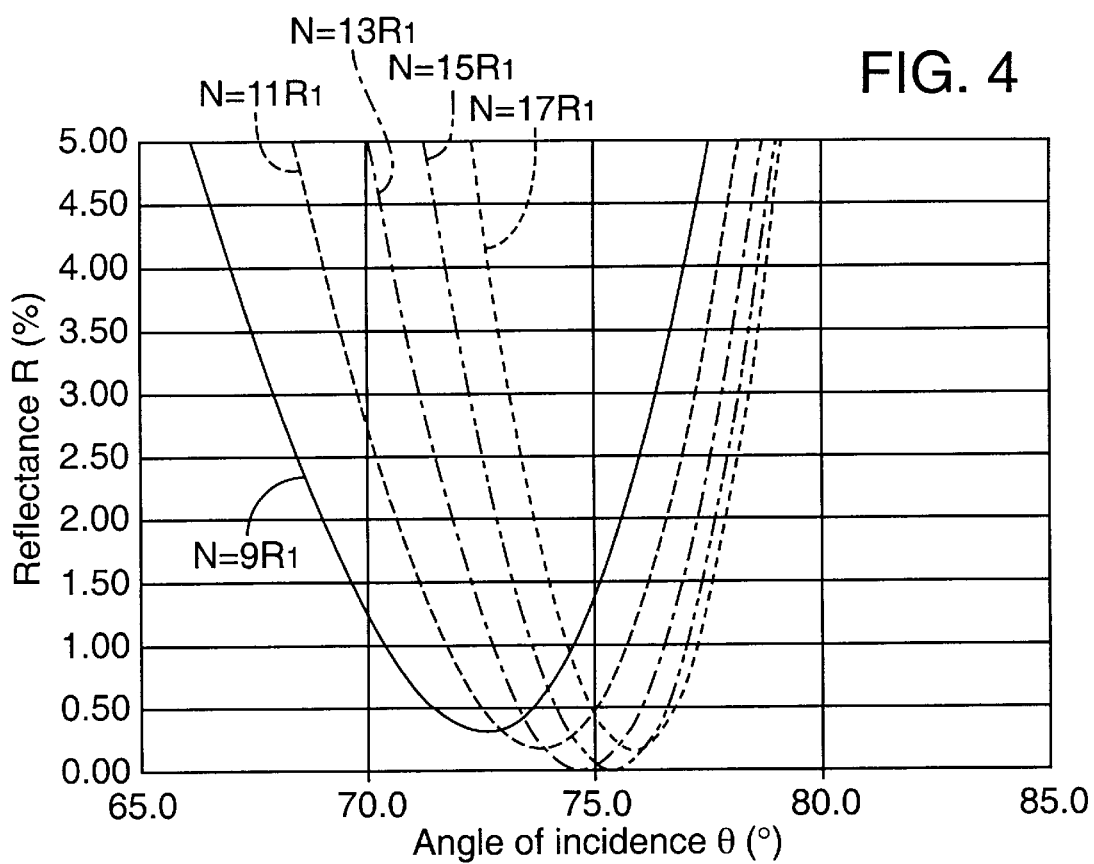
FIG. 4 is a plot of antireflection performance versus angle of incidence of p-polarized light at λ=248 nm for multilayer antireflection coatings according to Example Embodiment 3 having 9, 11, 13, 15, and 17 layers.

The angular characteristics of the multilayer antireflection coatings made according to this example embodiment were measured using p-polarized incident light at $\lambda=248$ nm. Table 3 shows, for each value of N, the angle of incidence at which reflectance was minimized and the reflectance under such conditions. FIG. 4 shows incidence-angle characteristics for each of the multilayer antireflection coatings according to this example embodiment. The data shown in Table 3 and FIG. 4 indicate that the multilayer antireflection coatings according to this example embodiment have a full antireflection effect with transmittance of 99% or greater when the angle of incidence is in the range $72° \leq \theta \leq 76°$. (For the calcium fluoride substrate alone, reflectance R=4.4% at $\theta=70°$ and R=10.8% at $\theta=75°$). These data also indicate that the angle of incidence at which reflectance is minimized is changed simply by changing the number of stacked layers.

TABLE 3

| Number of Layers (N) | Angle of Incidence θ at which Reflectance is Minimized (°) | Minimum Reflectance R (%) |
| --- | --- | --- |
| 9 | 72.6 | 0.3 |
| 11 | 73.8 | 0.2 |
| 13 | 74.8 | 0.1 |
| 15 | 75.4 | 0.1 |
| 17 | 75.9 | 0.2 |

Although vacuum vapor deposition is the preferred technique for applying each of the layers of a multilayer antireflection coating according to the invention, alternative techniques can be used, such as sputtering, ion plating, or chemical vapor deposition.

Thus, this invention provides multilayer antireflection coatings for grazing incident light. The coatings have a periodic structure (alternating layers of high-refractive-index material and low-refractive-index material) in which each layer of the high-refractive-index material has the same optical thickness, and each layer of the low-refractive-index material has the same optical thickness (which can be different than the optical thickness of the high-refractive-index material). Production is preferably initiated by forming a two-layer structure on a substrate, the structure comprising a high-refractive-index layer and a low-refractive-index layer under known coating-deposition parameters. Subsequent alternating layers are added under the same coating-deposition parameters. The resulting multilayer antireflection coating has a fixed optical-period length and optical-period ratio; by varying the number of stacked layers it is possible to obtain an antireflection effect for any of various angles of incidence in the range $70° \leq \theta \leq 80°$ with p-polarized light having a wavelength in the range $150 \text{ nm} \leq \lambda \leq 250 \text{ nm}$. Optical systems comprising optical elements having a multilayer antireflection coating according to the invention exhibit superior optical performance.

Whereas the invention has been described in connection with preferred embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A multilayer antireflection coating, comprising, from the medium side, multiple stacked layers of high-refractive-index material and low-refractive-index material arranged alternatingly in a sequentially stacked manner, each alternating layer of the high-refractive-index material having the same optical thickness, and each alternating layer of the low-refractive-index layer having the same optical thickness, the multilayer antireflection coating inhibiting reflection therefrom of incident p-polarized light having a wavelength λ such that $150 \text{ nm} \leq \lambda \leq 250 \text{ nm}$ incident on the multilayer antireflection coating at an angle of incidence θ such that $70° \leq \theta \leq 80°$.

2. The multilayer antireflection coating of claim 1, wherein:

each of the high-refractive-index layers and each of the low-refractive-index layers has a respective optical thickness, the antireflection coating having an optical period length nd, representing a sum of the optical thickness of the high-refractive-index layer and the optical thickness of the low-refractive-index layer, is within a range $0.6\lambda_0 \leq nd \leq 0.65\lambda_0$, wherein $\lambda_0$ is the wavelength of light incident to the antireflection coating; and the optical thickness of the high-refractive-index layer and the optical period exhibit a ratio Γ that is within a range $0.38 \leq \Gamma \leq 0.73$.

3. The multilayer antireflection coating of claim 2, wherein:

the high-refractive-index material comprises a substance selected from the group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of such compounds; and the low-refractive-index material comprises a substance selected from the group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of such compounds.

4. The multilayer antireflection coating of claim 2, having a total number N of layers within a range of $5 \leq N \leq 17$.

5. The multilayer antireflection coating of claim 4, wherein:

the high-refractive-index material comprises a substance selected from the group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of such compounds; and the low-refractive-index material comprises a substance selected from the group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of such compounds.

6. The multilayer antireflection coating of claim 1, having a total number N of layers within a range $5 \leq N \leq 17$.

7. The multilayer antireflection coating of claim 6, wherein:

the high-refractive-index material comprises a substance selected from the group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of such compounds; and the low-refractive-index material comprises a substance selected from the group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of such compounds.

8. The multilayer antireflection coating of claim 1, wherein:

the high-refractive-index material comprises a substance selected from the group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of such compounds; and the low-refractive-index material comprises a substance selected from the group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of such compounds.

9. An optical element, comprising:
(a) a substrate transmissive to light having a wavelength $\lambda$, wherein 150 nm $\leq \lambda \leq$ 250 nm; and
(b) an antireflective coating according to claim 1 on at least one surface of the substrate.

10. The optical element of claim 9, wherein the substrate is selected from a group consisting of silica glass, calcium fluoride, and magnesium fluoride.

11. The optical element of claim 9, wherein the layer closest to the medium side is a high-refractive-index layer.

12. A method for reducing reflection of grazing incident p-polarized ultraviolet light from a surface, the method comprising the steps:
(a) applying to the surface first and second stacked layers, the first layer being a high-refractive-index layer and the second layer being a low-refractive-index layer; and
(b) applying to the first and second layers additional high-refractive-index layers and low-refractive-index layers in an alternating manner to produce a multilayer antireflection coating on the substrate, the antireflection coating having a total number N of layers within a range of $5 \leq N \leq 17$, each alternating high-refractive-index layer having the same optical thickness, and each alternating low-refractive-index layer having the same optical thickness.

13. The method of claim 12, wherein N is even and the second layer contacts the surface of the substrate.

14. The method of claim 12, wherein N is odd and the first layer contacts the surface of the substrate.

15. The method of claim 12, wherein, in step (b), the antireflection coating is formed to have an optical period nd, representing a sum of the optical thickness of any of the high-refractive-index layers and the optical thickness of any of the low-refractive-index layers, the optical period being within a range of $0.6\lambda_0 \leq nd \leq 0.65\lambda_0$, wherein $\lambda_0$ is the wavelength of light to be incident to the antireflection coating; and the optical thickness of the high-refractive-index layer and the optical period exhibit a ratio $\Gamma$ that is within a range of $0.38 \leq \Gamma \leq 0.73$.

16. The method of claim 14, wherein the high-refractive-index layers comprise a substance selected from the group consisting of lanthanum fluoride ($LaF_3$), gadolinium fluoride ($GdF_3$), neodymium fluoride ($NdF_3$), dysprosium fluoride ($DyF_3$), yttrium fluoride ($YF_3$), and mixtures and compounds of such compounds; and the low-refractive-index layers comprise a substance selected from the group consisting of aluminum fluoride ($AlF_3$), magnesium fluoride ($MgF_2$), calcium fluoride ($CaF_2$), sodium fluoride (NaF), cryolite ($Na_3AlF_6$), thiolite ($Na_5Al_3F_{14}$), and mixtures and compounds of such compounds.

* * * * *